April 26, 1966  A. P. KELLEY ETAL  3,247,832
BOILING PROCESS CONTROL SYSTEM
Filed May 26, 1961  4 Sheets-Sheet 1

INVENTORS
ARCHIBALD P. KELLEY
ROGER A. SEVERNS
BY Francis O'Behr
ATTORNEY

April 26, 1966 A. P. KELLEY ETAL 3,247,832
BOILING PROCESS CONTROL SYSTEM
Filed May 26, 1961 4 Sheets-Sheet 2
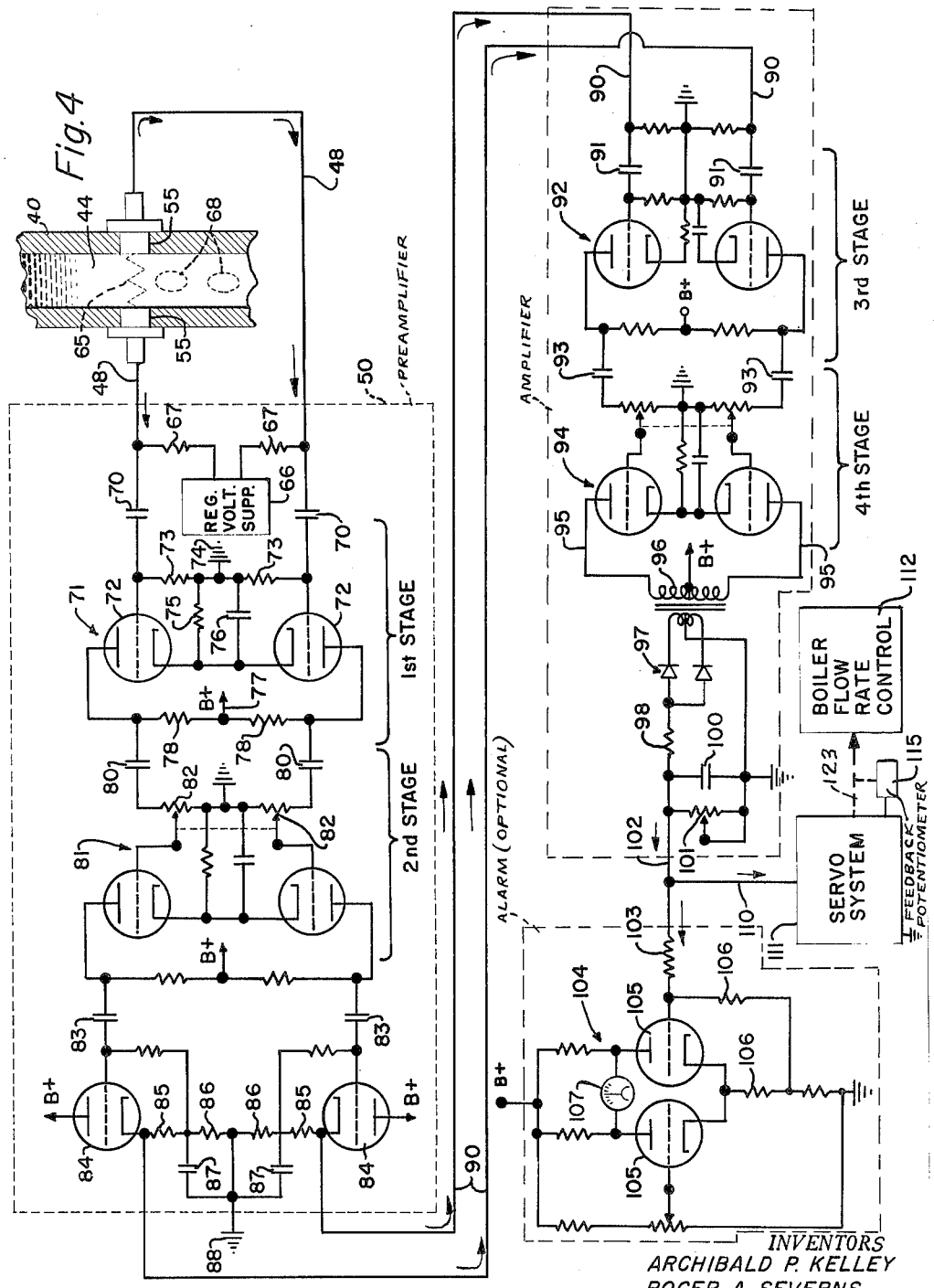
INVENTORS
ARCHIBALD P. KELLEY
ROGER A. SEVERNS
BY
Francis O'Beke
ATTORNEY

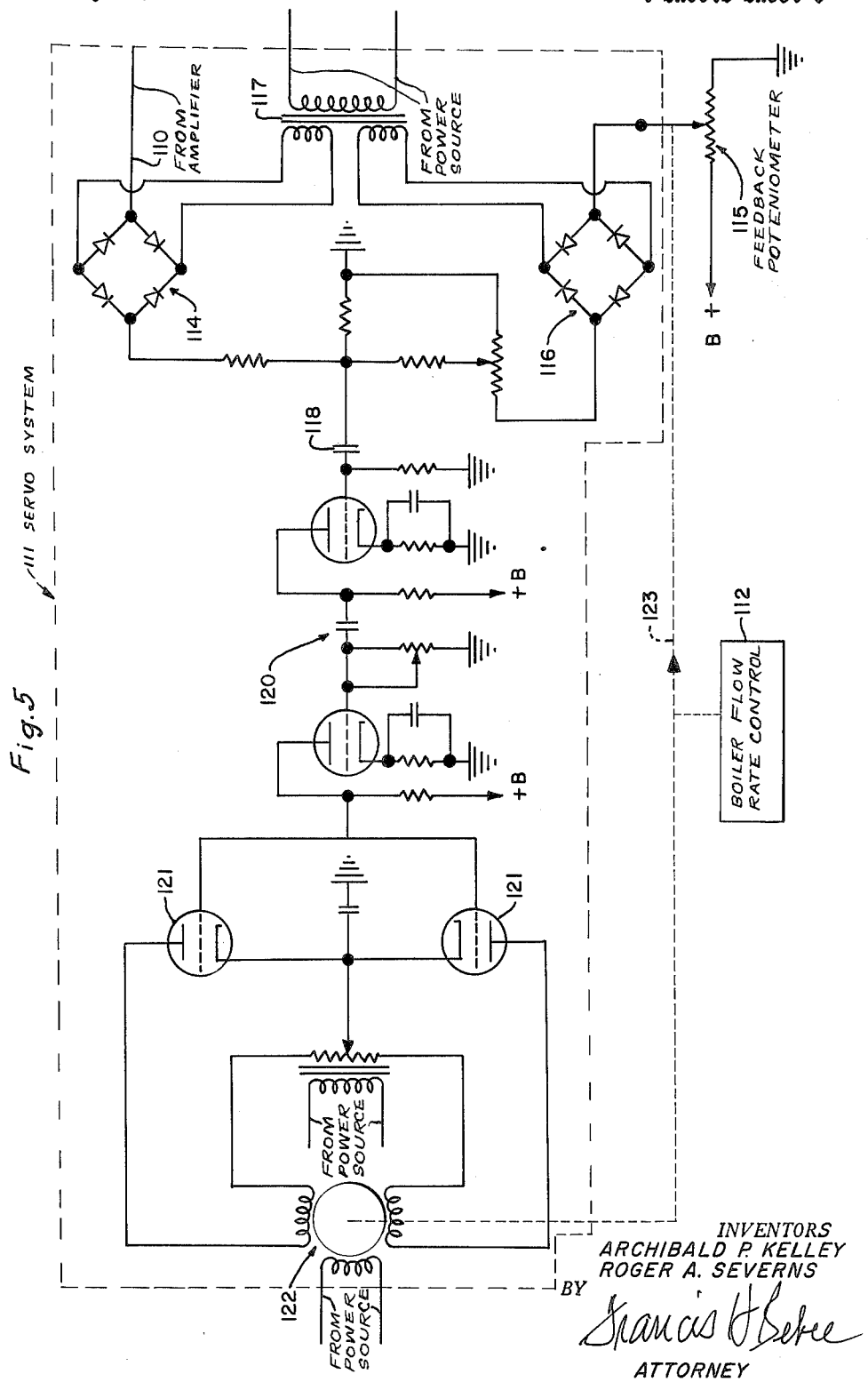

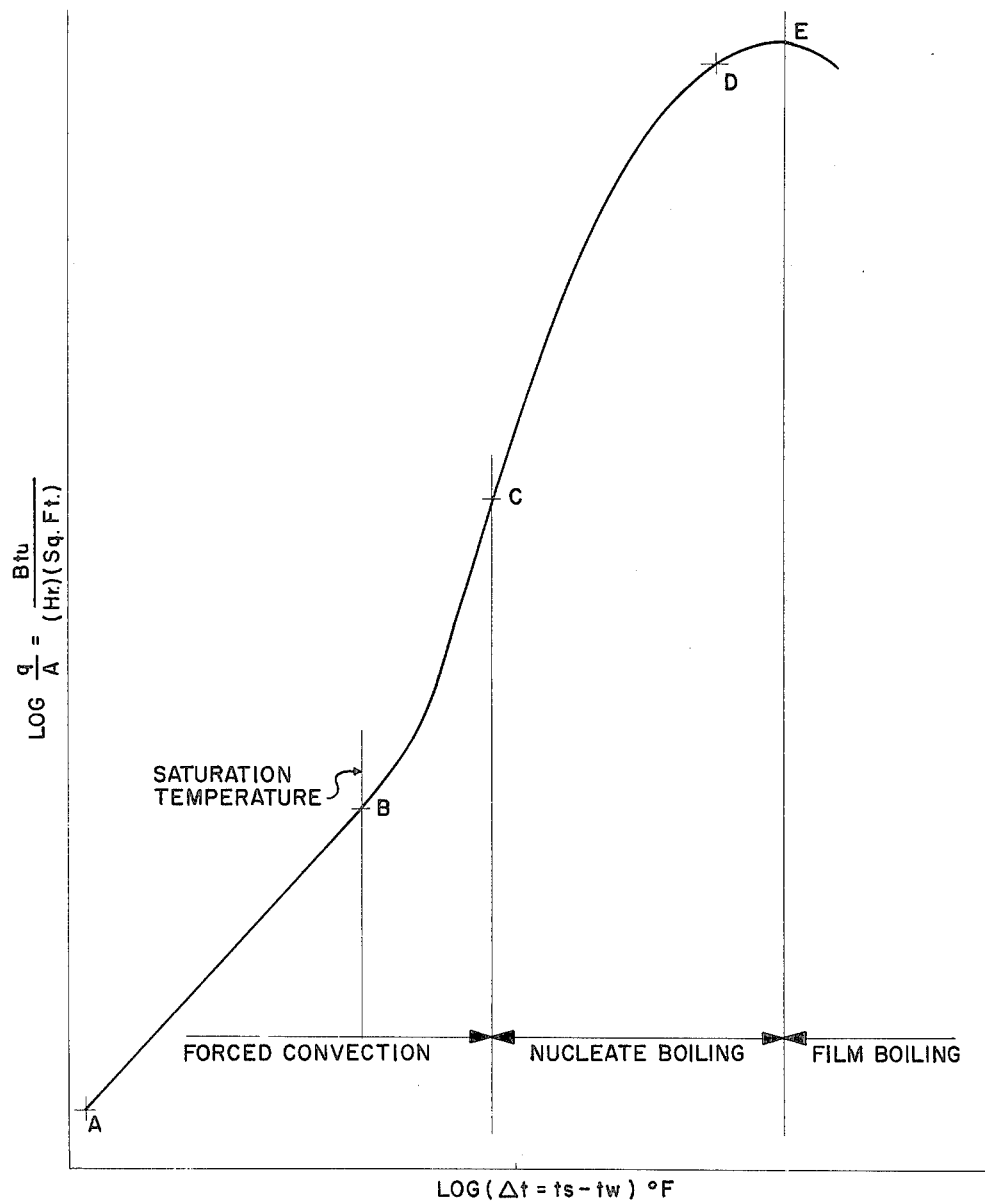

— 3,247,832
BOILING PROCESS CONTROL SYSTEM
Archibald P. Kelley and Roger A. Severns, both of Scottsdale, Ariz., assignors to The Garrett Corporation, Los Angeles, Calif., a corporation of California
Filed May 26, 1961, Ser. No. 112,983
8 Claims. (Cl. 122—451)

This invention relates to control systems for pressurized water reactors and aims to provide an apparatus for indicating and controlling the boiling rate and fluid flow through a reactor so as to effect maximum heat transfer with no danger of burnout.

In the operation of pressurized water reactors, and particularly those employing one or more flow passages of small cross section, there is a real need to control the fluid flow through the passages so as to prevent burnout. In studying the boiling heat transfer (flux) from a heat exchange element or other solid surface to water, the relationship between the heat flux from the solid surface to the liquid and the difference between the surface temperature ($t_s$) of the solid and the bulk temperature of the liquid ($t_w$) is of interest. At values of solid surface temperature below the water saturation temperature (at constant pressure), the heat transferred is proportional to the temperature difference ($t_s-t_w$). As the surface temperature exceeds the saturation temperature of the fluid, the heat flux rises very rapidly for a small increase in temperature difference and reaches a maximum known as the "burnout heat flux." At and beyond this point the corresponding wall temperature can exceed the melting point of the metal surface, so that burnout may occur.

Because of the danger of burnout and the unavailability of any satisfactory means for controlling reactor operation so as to eliminate this danger, most pressurized water reactors have been operated at or near the temperature of saturation. At this temperature there is some nucleate boiling, but the rate of heat transfer is undesirably low. This invention is based on the discovery that it is possible to measure the rate of boiling in the vapor generating zone and control the flow of fluid through the reactor in accordance with such measured boiling rate. This makes it possible to operate the reactor immediately below the level of burnout heat flux near the point of maximum heat transfer. The "boiling rate," as that term is used herein, is a measure of the total volume of vapor bubbles passing through a portion of the vapor generating zone of a boiler or reactor element per unit of time, and more specifically means the ratio of the volume of vapor to the volume of water in a specific portion of a heating element per unit of time.

It is therefore an object of this invention to provide a boiling process control system which makes it possible to operate a pressurized water reactor at maximum efficiency with no danger of burnout.

Another object of this invention is to provide an apparatus for measuring the rate of boiling in the heating zone of a reactor and then controlling the fluid flow through the reactor in accordance with a desired boiling rate.

Another object of this invention is to provide a boiling process control system which includes an electric circuit having a detecting means therein which is adapted to create voltage pulses in accordance with the rate of boiling or changes in the total volume of vapor bubbles flowing through a portion of the heating zone of the system.

A further object is to provide a boiling process control system which includes an electric circuit having a detecting means therein which is adapted to create voltage changes in accordance with changes in the rate of boiling, and means for amplifying such voltage changes so that they may be used to operate both a readout instrument and a servomechanism for controlling the fluid flow in the boiling process.

A still further object of the invention is to provide a boiling process control system as set forth in the previous paragraph wherein an integrator is employed in the electrical circuit to correlate the voltage changes with the corresponding changes in the rate of boiling.

It is another object of the invention to provide a closed cycle boiling process control system including a pressurized water reactor for a first liquid, a heat exchanger wherein the output of the reactor is cooled by heat transfer to a second liquid, a pump for continuously circulating the first liquid through the reactor, and a bypass valve controllable in response to integrated variations in electrical resistance measured across two electrodes immersed in the reactor fluid to vary the flow through the reactor and thereby maintain maximum heat transfer and efficiency at all times.

The above and other features and objects of the invention will be apparent from the following description and the accompanying drawings, in which:

FIG. 4 is a schematic diagram representing the electronic circuitry, of various principal components of the control system;

FIG. 5 is a schematic diagram representing additional electronic circuitry that may be used in the control system; and FIG. 6 is a graph showing the several phases involved in the simulated boiling of a liquid.

Figure 1:
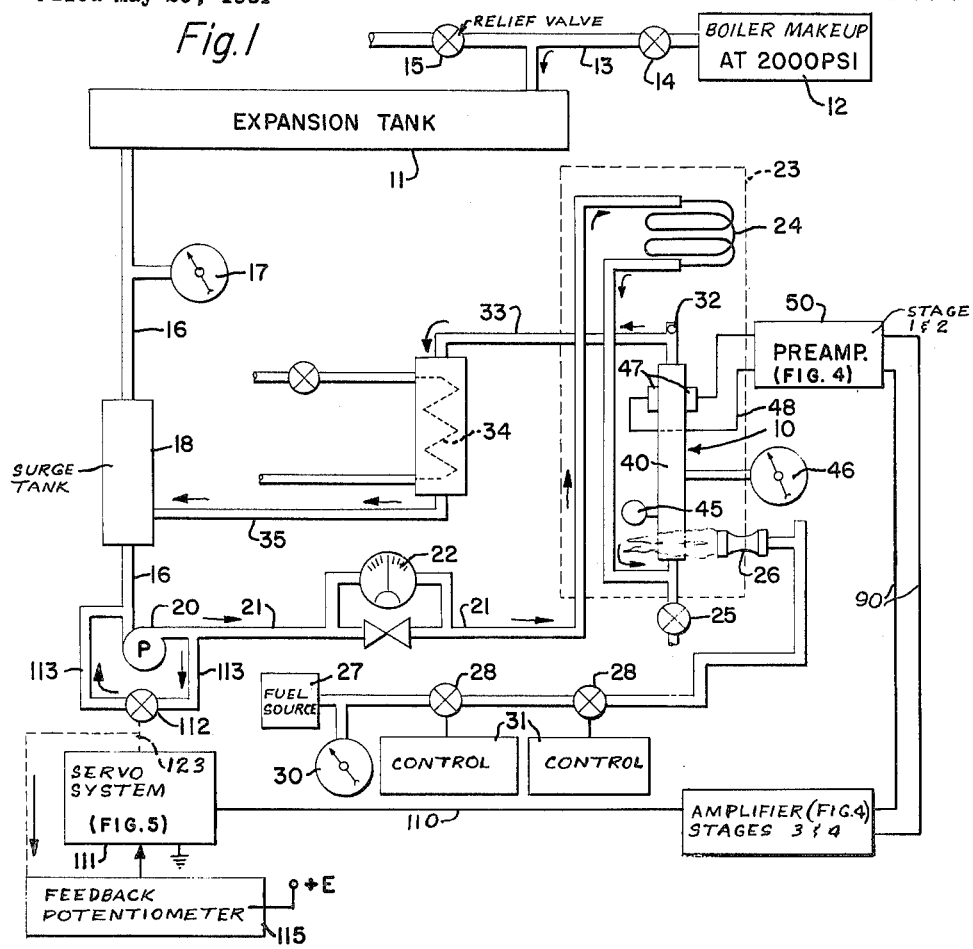
FIG. 1 is a schematic flow diagram of a pressurized water reactor system in which the features of the invention have been included.

Referring now to the drawing, and particularly FIG. 1, the pressurized water reactor system, in the form selected for illustration, comprises a gas fired boiler or reactor 10 which is supplied with suitable fluid from a supply and expansion tank 11. The fluid may be water, liquid metal, such as sodium or mercury, or any other liquid which may be maintained under pressure by a high pressure inert gas like nitrogen and used to produce energy in changing from liquid to gaseous state. Such liquid may be fed to the expansion tank 11 from a suitable source 12 through line 13 having control valve 14 and relief valve 15 connected thereto. A conduit 16 having a pressure gage 17 therein connects the boiler fluid source to a surge tank 18 and leads to a high pressure pump 20 which constitutes the main boiler fluid circulating means. The fluid is then led directly to the boiler 10 through a pipe or conduit 21 having a suitable flowmeter 22 therein so that the flow to the boiler may be observed or recorded. A stack or flue 23 is provided around the boiler 10 and a boiler fluid preheating coil 24 may be arranged therein to utilize the waste heat and initially raise the temperature of the fluid en route to the lower end of the boiler. Should it be necessary to dump or drain the boiler, a drain valve 25 may be provided. The fluid, in the instance shown, is heated to boiling temperature in any convenient manner, such as by one or more gas burners 26 connected to a gas fuel source 27 and under the control of valves 28 and other conventional control devices 31. A gage 30 is coupled to the outlet of fuel supply tank 27. In actual practice, however, the heating may be done with a suitable source of nuclear energy instead of the gas burners 26.

For the purpose of the present description, it will be assumed that the boiler fluid is water, and this fluid is converted to steam in the reactor or boiler 10 which may have a safety rupture disc 32 at the upper end thereof. A conduit 33 leads the steam or vapor to a heat exchanger 34 or other apparatus, such as a turbine, which is to be operated and perform useful work with the energy produced in the reactor. The spent fluid then flows through a return pipe or conduit 35, back to the surge tank 18 where it mixes with the fluid therein and is otherwise made ready for recirculation in the reactor system.

According to the present invention, the rate of boiling in the reactor 10, and especially changes in such rate, may be measured and controlled so as to permit operation at maximum heat transfer rate without danger of burnout. While the invention is applicable to any type of conventional boiler, it has been shown in the present instance applied to the closed loop pressurized reactor system described above. This system has been designed to simulate closely the heat transfer in a pressurized water nuclear reactor.

Figure 2:
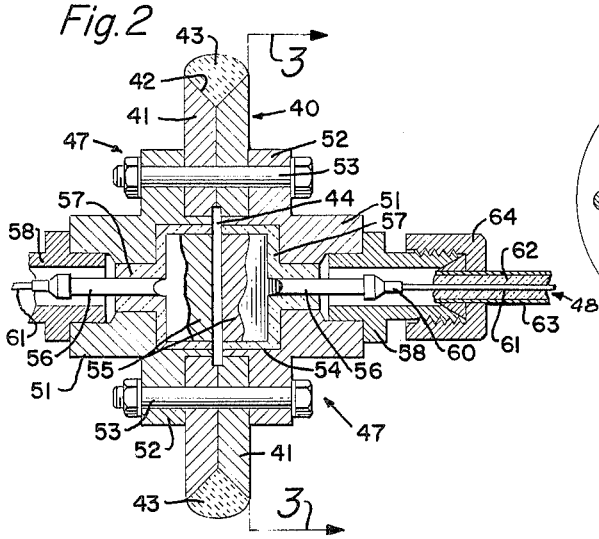
FIG. 2 is a vertical sectional view of one of the detectors used in the flow passage of one of the heat exchange elements.
Figure 3:
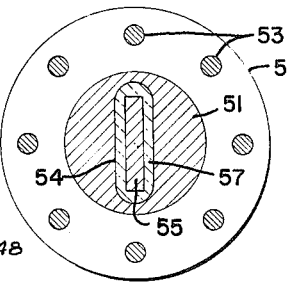
FIG. 3 is a vertical sectional view taken along the line 3—3 of FIG. 2.

More particularly, the invention is applied to a single heat exchange member or element 40 of the simulated reactor 10, which element is of special construction and may constitute a single control member of a nuclear reactor of large capacity having a plurality of heat exchange elements therein. As shown in FIG. 2, the special element 40 comprises a pair of plates 41 having angularly disposed longitudinal edges which form a trough 42 when the plates are abutted together. This trough is suitable for the reception of welds 43 on each edge which bind the plates together into a unitary structure. Each of the plates 41 also has a shallow longitudinal groove on the inside face thereof, which together form an elongated ribbon-like tube or passage 44 through which the heated fluid passes. The depth of the passage 44 is preferably small and may vary from 0.050 to about 0.50 inch and provides an efficient heating passage so that when the flames from a plurality of burners 26 or other suitable heat source are applied to the outside faces of the elongated element, the reactor fluid will be rapidly heated to boiling temperature. Fluid temperatures in the passage 44 may be measured by one or more thermocouples 45 (FIG. 1) and the pressure indicated on a conventional gage 46.

In order to appreciate the importance of the present invention, an understanding of the various phases involved in the boiling of a liquid is important. There is a helpful explanation of the boiling phenomenon on pages 296 and 297 of the second edition of the book entitled "Heat Transmission," by McAdams. A plot on a logarithmic scale of the observed flux in a boiler (the B.t.u.'s per hour per square foot of boiler tube surface) against the difference in temperature ($\Delta t$) between that of the tube surface ($t_s$) and that of the boiler fluid ($t_w$) is shown in the curve ABCDE of FIG. 6. In the range AB of the curve, the temperature difference $\Delta t$, and consequently the rate of boiling, is so small that the flux is of the same order of magnitude as that obtained in warming the liquid without phase change. Above the saturation temperature shown in the curve, the slope for portion BC starts to increase. Then, as $\Delta t$ is increased further, more rapid boiling known as "nucleate boiling" occurs, and the slope in the range CD is quite large. Finally, at point E the maximum flux is reached, which for water is as large as 400,000 B.t.u.'s per hour per square foot, and the corresponding temperature difference $\Delta t$ is about 45° F. This is the peak of nucleate boiling and beyond point E film boiling occurs. The wall or tube temperature in the region of E can be higher than the melting point of the metal surface because of the beginning of a vapor film of low thermal conductivity on the surface. For this reason burnout may accompany an increase in heat flux above the peak value at point E. The heat flux at this point is frequently called the "burnout heat flux."

Because of the danger of burnout, most pressurized water nuclear reactors are operated well below peak heat transfer flux in the region BC on the FIG. 6 curve. Maximum heat transfer would be obtained if operation could take place at point D or immediately below, but there have been no satisfactory means available in the past for controlling the operation of a nuclear reactor to obtain this desirable result. This may now be accomplished in accordance with the present invention.

As shown in FIGS. 1 and 2, a pair of detector heads 47 are attached to the heat exchange element 40 at or near the upper end thereof above the burners 26 where there would be the greatest heat flux. These detector heads are connected by conductors 48 with a special preamplifier 50, which is shown in detail in FIG. 4 and will be described more fully hereinafter. Each detector head 47 comprises a cylindrical body portion 51, which is mounted in a suitable opening provided in the element 40, and a heavy attaching flange 52 so that the two detector heads may be securely fastened to the element 40 with a plurality of bolts 53. The portion of the cylindrical body portion 51 which extends into the element 40 and passage 44 has a slot 54 formed therein for the reception of an elongated rectangular electrode 55. The electrodes 55 of the two detector heads are placed in substantial alignment directly opposite one another and provided with connector bars 56 extending outwardly through a cylindrical opening provided in the body portion 51. To hold the electrodes 55 in place and properly insulate them from the associated detector heads and the boiler tube plates 41, said electrodes and connector bars are embedded in glass and/or other suitable ceramic insulating material 57, which also provides a suitable strong and fluid-tight connection or mounting that is resistant to nuclear radiation. A hollow nipple 58 is fixed in the outer end of the body portion 51 and forms a housing for the end of the connector bar 56 so that it may be electrically connected by a coupling 60 with a conductor or wire 61 (or conductor 48). Each wire 61 is mounted in suitable insulating material 62 within a steel tubing or shield 63 which is held in proper position in the nipple by a cap 64 threaded on the outer end of the nipple. The use of the shield 63 is important in avoiding the pickup of extraneous noise signals which might interfere with the operation of the detector electrodes. In this instance, the wire 61 and shield 63 constitute the conductors 48 leading to the preamplifier 50 which will now be described.

Referring to FIG. 4, where the arrangement of the electrodes 55 in the passage 44 is shown diagrammatically on an enlarged scale, it is at present understood that the fluid circulating through said passage acts as a resistance 65 in a circuit which includes a regulated voltage supply 66 which is connected through resistors 67 to the conductors 48. It has been found that the heat transfer fluid acts as a resistance when said fluid is a leaky or low resistance material, but the electronic action appears to become capacitive for less conductive or more highly resistant materials. Thus, the heat transfer or reactor fluids might range from distilled water, as the most highly resistive, to liquid metal as the most conductive or least resistive. Only minor changes in circuit constants would be required for any such changes in reactor fluid. As long as the fluid flowing through the passage is of uniform consistency, the voltage drop across the conductors will remain substantially constant. When fluid vapor starts to generate, however, vapor bubbles 68 will flow upwardly through the passage 44. The presence of a bubble 68 between the electrodes 55 appears to have the effect of modifying the current path and hence increasing the apparent resistance 65. This results in momentarily increasing the voltage drop across the conductors 48 so that a voltage pulse is sent through a pair of coupling condensers 70 into a first stage amplifier 71. Each voltage pulse is then a measure of the volume of vapor passing between the electrodes at any particular instant. The amplifier 71 includes first and second triodes 72 having grid resistors 73 connected between the grids thereof and a ground connection 74. A common cathode bias resistor 75 and bypass capacitor 76 are provided in the cathode circuits. Plate current is supplied from a source 77 and passes through a resistance 78 to the anode of each tube. Thus, the voltage pulse fed from the condensers 70 into the grid of each tube results in an increased current flow passing from the plate of each tube through coupling condensers 80 into a second stage amplifier 81. This stage is substantially identical with the first stage except that ganged or interconnected variable resistors 82 are included in the grid circuits of the two triodes. The amplifiers shown and used herein are known as differential amplifiers and they are designed to effect common mode rejection and thus prevent any weak signals emanating from the changes in apparent resistance 65 from becoming lost in the electrical noise level.

In order to condition the pulses flowing from the plates of the triodes in the second stage amplifier 81, said pulses are fed through coupling condensers 83 into the grids of two triodes 84 which are provided in a cathode follower circuit. This circuit has the cathodes of the two triodes interconnected through resistors 85 and 86, with condensers 87 shunted across the resistors 86 and grounded at 88. The plates are connected to suitable voltage sources, as indicated. Conductors or lines 90 placed between the resistances 85 and the associated cathodes are properly shielded and adapted to carry the pulses for a considerable distance and then pass through coupling condensers 91 to a third stage amplifier 92. This cathode follower circuit is designed with a low impedance output so that it will deliver much more of its output through the lines 90 than is possible with a conventional amplifier.

It will be noted that amplifier 92 is identical in general layout with amplifier 71. Plate current from the triodes in this amplifier is fed through coupling condensers 93 into a fourth stage amplifier 94. The circuit arrangement of this fourth and last stage of amplification is substantially the same as that of amplifier 81. The finally amplified pulses pass from the plates of the amplifier triodes through conductors 95 to the input or primary of a magnetic core transformer 96. The output or secondary of the transformer passes through a conventional full wave diode rectifier 97 and resistance 98 and is then suitably integrated by a condenser or capacitor 100 and a shunt variable resistor 101. Such an R-C integrator stores the random input pulses as a varying D.C. voltage whose absolute value is that of the average of all the pulses received per unit of time. Such value is that desired for the performance of certain specific operations in accordance with this invention.

It has been demonstrated that, as the number and size or total volume of the vapor bubbles passing the detectors per unit of time are an index of the boiling rate at a given pressure, so also are the electrical pulses produced by the bubbles in the circuitry of this detector system. Thus, the D.C. voltage charge stored in the integrator condenser 100 is an exact index of the instantaneous vapor volume between the electrodes and hence an index of the relative degree of boiling occurring in the boiler at any particular time. The voltage output rises in a direct proportion to the vapor volume increase in the reactor element ideally suiting this system to direct application to proportional indicating, alarm, and/or control systems.

As shown in FIG. 4, the accumulated charge on the condenser 100 of the R-C integrator is applied through a conductor 102 having a resistance 103 therein to a vacuum tube voltmeter or alarm circuit 104. This circuit includes a double triode or a pair of triodes 105 having the cathodes thereof interconnected and a plurality of resistors 106 suitably in circuit therewith. A voltmeter 107 is shunted across the plate circuits and this meter is calibrated to give a reading which is a measure of the steam quality (percent of vapor vs. percent of liquid) or boiling index as determined by the voltage pulses emanating from the detector electrodes 55. In this manner it is possible to make a direct measurement of the rate of boiling or the steam quality, if such a measurement should be desired. It would also be possible to have the output of one or both triodes 105 actuate another form of indicator, such as an alarm signal, which might be arranged for actuation when the boiling rate (or total vapor volume per unit of time) exceeds a predetermined point.

Another function which may be performed by the accumulated charge on the condenser 100 is to regulate the flow of fluid through the boiler tube 40; and since the voltage value of the charge on the condenser is determined by the rate of boiling measured by the detector electrodes 55, such regulation of fluid flow may be in accordance with the rate of boiling. To accomplish this desirable result, the accumulated D.C. voltage from the condenser 100 is applied through conductor 102 and a line 110 to the input amplifier of a servo system 111 which is of a positive feedback, null-balancing design. The servo system 111 controls the operation of a bypass valve 112 (FIG. 1) which is connected by conduits 113 to each side of the pump 20.

As indicated in FIG. 5, the average voltage or command signal from the integrator condenser 100 may be fed into a synchronous switch or diode ring modulator 114, where it is chopped to 60 c.p.s. This chopped signal is compared at alternate half cycles with a nulling, positive feedback voltage from a feedback potentiometer 115 fed through a second synchronous switch or diode ring modulator 116. Each of the synchronous switches 114 and 116 is connected to an associated secondary or output stage of a power transformer 117. The voltage difference resulting from this comparison is fed through a coupling condenser 118 to an amplifier 120; and the amplified voltage from the plate circuit of the second triode in the amplifier is fed to the grids of a pair of triodes 121. These triodes constitute a phase-sensitive output amplifier stage and control the operation of a servomotor 122 which is arranged to actuate the bypass valve 112.

Thus, as long as the two D.C. voltages emanating from the diode rings 114 and 116 nullify one another, the bypass valve 112 will remain stationary. The circuit constants are so arranged that with no charge on the integrator condenser 100 (indicating no boiling), the servo system 111 nullifies and stops with the valve open and will continue to bypass fluid around the circulating pump 20. As boiling begins and increases in activity, a D.C. voltage appears and increases in magnitude on the integrator condenser 100. The servo system, finding a voltage on its input, seeks a bucking null voltage by turning the bypass valve 112 and, through a mechanical linkage 123, its associated feedback potentiometer 115 in the proper direction through a precise programmed amount to obtain an equal and opposite voltage. When this occurs, the servo system will stop and remain at this new point until another change in voltage occurs at the integrator condenser 100.

It will be understood that as long as the bypass valve is open, the fluid flow through the pressurized water reactor will be reduced from the flow normally attainable by the pump 20. Closing or reducing the flow through the bypass valve, therefore, has the effect of increasing the fluid flow through the passage 44 of the heat exchange element 40. If desired, however, the desired control of flow through the reactor could be obtained through direct control of the pump 20 in accordance with changes in the rate of boiling as measured by the detector electrodes 55. In addition, it will be understood that it might be possible to increase the reliability and reduce the size of the electronic circuitry by using transistors and/or magnetic amplifiers in place of the triode vacuum tubes shown and described.

Various other changes may be made in the control system herein described and certain features may be employed without others without departing from this invention or sacrificing any of its advantages.

We claim:

1. Apparatus for controlling a boiling operation, comprising: a plurality of conduits forming a fluid circulating loop, one of said conduits constituting a heat exchange element having parallel side walls which are closely spaced from one another to provide a narrow passage for the fluid; means for circulating fluid through the conduits in said loop; means for heating the fluid as it passes through said one conduit to produce vapor bubbles therein which move through said conduit in a volume which varies in accordance with the rate of boiling of said fluid; circuit means including a pair of electrodes mounted in said parallel side walls and positioned so that the fluid and vapor bubbles circulating through said narrow passage produce voltage changes in said circuit means which vary only in response to the variations in the volume of bubbles in said passage; means for amplifying and integrating such voltage changes; servo means actuated by such integrated voltage changes; and means operated by said servo means for regulating the flow of fluid through the narrow passage in said heat exchange element in response to such integrated voltage changes.

2. In a boiling process control system including heat exchange equipment for increasing the temperature of a fluid flowing through a conduit, signaling apparatus for indicating an undesired deviation from a predetermined boiling rate, the signaling apparatus comprising:

means coupled to the conduit for developing selectively an electrical analog of the vapor bubbles passing through at least a portion of the conduit;

means coupled to the analog developing means for amplifying the electrical analog;

means coupled to the amplifier for integrating the electrical analog to produce an electrical signal representing cumulative variations in the analog signal;

and means coupled to the signal-producing means for signifying to an observer the occurrence of an undesirable deviation from the predetermined boiling rate.

3. In a boiling process control system as represented in claim 2 apparatus for indicating an undesired deviations from the predetermined boiling rate wherein the analog developing means further comprises a plurality of electrodes effectively exposed to the interior of the conduit.

4. A regulated fluid boiling system comprising:

a plurality of conduits interconnected to form a fluid circulating loop, one of the conduits constituting a heat exchange element having closely-spaced parallel side-walls to form a narrow passageway for the fluid;

means for circulating the fluid through the conduit loop;

means for heating the fluid as it passes through the heating element in order to produce vapor bubbles which move through the passageway in a volume determined, in part, by the boiling rate of the fluid;

means mounted on the heating element for developing a randomly-pulsating electrical analog of the random vapor bubbles passing through the heating element;

means coupled to the analog-producing means for integrating the electrical analog to produce a control signal;

and means coupled to the integrating means and to the circulating means, and responsive to the control signal for changing the rate of flow of fluid to compensate for incipient variations from a predetermined boiling rate of the fluid.

5. A regulated boiler as represented in claim 4 wherein the analog-developing means comprises a multiplicity of electrodes exposed effectively to the interior of the heating element.

6. A regulated boiler as represented in claim 5 wherein the analog means further comprises an amplifier having input terminals coupled to the electrodes.

7. A regulated boiler as represented in claim 6 wherein the flow-rate varying means comprises:

a fluid bypass conduit coupled in parallel relation to the circulating means;

a fluid-flow control valve in series with the bypass conduit;

and means including a follow-up servomotor system having an input terminal coupled to the control-signal producing means and a servomotor output coupled in driving relation to the fluid-flow control valve.

8. A boiling process control system characterized by high efficiency, sensitivity, and accuracy achieved through use of electromechanical apparatus for detecting and regulating fluid flow to maintain the boiling rate of a fluid flowing through an elongated, hollow heating element, at a boiling indicia slightly below the burnout boiling condition, the control system comprising:

a pair of spaced-apart electrodes adapted to be disposed within the heating element in mutually opposing relation, and adapted to have an interelectrode gap operative effectively across at least one dimension of a transverse cross section of the fluid stream flowing through the heating element, so that the electrodes may sense substantially all of the vapor bubbles present within the operative cross section at any instant of time;

means including an amplifier coupled to the electrodes for developing an electrical analog of the ratio of vapor bubbles to fluid within the operative cross section;

means coupled to the developing means for integrating the electrical analog to produce a control signal;

and means coupled to the integrating means and responsive to the control signal for regulating fluid flow through the heating element in order to maintain a predetermined boiling rate.

References Cited by the Examiner

UNITED STATES PATENTS

| 2,170,346 | 8/1939 | Dickey | 122—448 |
| 2,217,637 | 10/1940 | Junkins | 122—448 |
| 2,411,986 | 12/1946 | Cowherd | 73—32 X |

FOREIGN PATENTS

| 325,277 | 2/1930 | Great Britain. |
| 817,121 | 7/1959 | Great Britain. |

JAMES W. WESTHAVER, *Primary Examiner.*

FREDERICK L. MATTESON, JR., PERCY L. PATRICK, *Examiners.*